(12) United States Patent
Romain et al.

(10) Patent No.: US 7,602,480 B2
(45) Date of Patent: Oct. 13, 2009

(54) METHOD AND SYSTEM FOR TRACKING A MOVING STATION OR TARGET IN FREE SPACE COMMUNICATIONS

(75) Inventors: Dennis M. Romain, Morristown, NJ (US); Robert D. Trachtenberg, Mountain Lakes, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 4 days.

(21) Appl. No.: 11/259,501

(22) Filed: Oct. 26, 2005

(65) Prior Publication Data

US 2008/0002190 A1 Jan. 3, 2008

(51) Int. Cl.
*G01B 11/26* (2006.01)
(52) U.S. Cl. .................................. 356/139.01
(58) Field of Classification Search ............. 356/139.01
See application file for complete search history.

(56) References Cited

U.S. PATENT DOCUMENTS

| | | | | |
|---|---|---|---|---|
| 5,612,883 A | * | 3/1997 | Shaffer et al. | 701/300 |
| 6,057,915 A | * | 5/2000 | Squire et al. | 356/139.05 |
| 6,172,747 B1 | * | 1/2001 | Houlberg | 356/139.04 |
| 2001/0037185 A1 | * | 11/2001 | Strietzel et al. | 702/152 |
| 2006/0024061 A1 | * | 2/2006 | Wirth et al. | 398/129 |

* cited by examiner

*Primary Examiner*—Thomas H Tarcza
*Assistant Examiner*—Luke D Ratcliffe

(57) ABSTRACT

A method for target acquisition and tracking of a moving station or target (e.g., an unmanned aerial vehicle) for carrying out free space optical communications uses an "elapsed time"-based approach to determine the position of the moving station at any future time, based on the time difference since the moving station's last known position. For example, the vehicle may be for purposes of reconnaissance, where the optical link provides a secure and high-bandwidth communications pathway between the moving station and a ground station. A mathematical model of the moving station's expected periodic flight path is combined with position and time elements to accurately predict the future position of the moving station for target re-acquisition. The model is a cubic spline interpolation of known flight path waypoints. The system may also employ multiple waypoints in initial acquisition, by alternating acquisition attempts over several waypoints instead of "staring" at a single waypoint.

22 Claims, 5 Drawing Sheets

METHOD AND SYSTEM FOR TRACKING A MOVING STATION OR TARGET IN FREE SPACE COMMUNICATIONS

STATEMENT REGARDING FEDERALLY SPONSORED RESEARCH

This invention was made with Government support. The Government has certain rights in this invention.

FIELD OF THE INVENTION

The present invention relates to optical communications and, more particularly, to optical communication over free space.

BACKGROUND OF THE INVENTION

Free space optical communications involve using light to transmit data across the open distance between two points, in a line-of-sight manner, and without the use of an optical waveguide or other medium. Typically, transmissions are made through the atmosphere or in space/vacuum using a laser system, or, in some short-distance cases, LED's or the like. For a laser communication system, encoded binary data is transmitted using modulated laser beams that travel from the sending station to the receiving station. In the case where one or both of the stations are in motion, e.g., an aircraft and a ground terminal, satisfactory transmission relies on the ability to precisely point the optical equipment at the remote station, such that the energy of the laser is received with minimal loss at the remote station.

The initial process of target location and optical pointing is known as "acquisition." The ongoing process of following the movements of the remote station over time is known as "tracking." The problem is to design an algorithm for acquisition and tracking that increases the time during which data can be reliably transmitted between remote stations, taking into account the intervals when laser transmissions are obstructed or are disabled for varying time durations. In the past, tracking algorithms used a tracking filter technique (e.g., a Kalman filter) to extrapolate from the last known position and velocity, to predict future positions of the remote (moving) station. When the tracking filter could no longer be used due to the excessive error growth of estimated values, an attempt was made to select a single "approaching" waypoint in the expected path of the remote station. In particular, re-acquisition after loss of tracking lock typically involves pointing the optical terminal to "stare" at a location that the remote station is expected to traverse. The Kalman filter can provide such a location only for a limited time after tracking lock has failed and no new position data has been received from the remote station during that interval, e.g., over a supervisory channel. After this time the Kalman filter's location estimate is not reliable because the variances of these estimates have grown too large and/or the motion model (e.g., constant acceleration) is not valid. Beyond that point in time another strategy is required for re-acquisition.

SUMMARY OF THE INVENTION

An embodiment of the present invention relates to a method and system for target acquisition and tracking of a moving station or target (e.g., an unmanned aerial vehicle or "UAV") for carrying out free space optical communications. For example, the UAV may be for purposes of reconnaissance and surveillance, wherein the optical link provides a secure and high-bandwidth communications pathway between the moving station and a ground station, for, e.g., transmitting real-time video or the like as well as supervisory channel messages to aid ground terminal pointing and tracking. The method uses an "elapsed time"-based approach to determine the position of the moving station at any future time, based on the time difference since the moving station's last known position. A mathematical model of the moving station's expected periodic path of travel is combined with position and time elements to accurately predict the future position of the moving station.

For carrying out the method, a flight path and a set of waypoints along the flight path are first chosen based on mission parameters. For example, for aerial reconnaissance and surveillance in a military context, a repeating "figure-8" flight pattern at constant altitude may be used. The chosen waypoints (in terms of longitude and latitude) are then correlated to a time index based on the moving station's pre-determined aerial speed, where the time intervals between waypoints are calculated based on the path distance between successive waypoints and the pre-determined speed (time=distance/speed). Subsequently, temporal evolution of the path of the moving station between waypoints is estimated through cubic spline interpolation of the waypoint coordinate versus time data. In other words, the waypoints provide discreet data points of expected longitude and/or latitude versus time, while the cubic spline interpolation provides a mathematical estimate (i.e., spline curve) of the location as a function of time between the discreet waypoints.

During flight, the moving station periodically transmits, over a supervisory channel, longitude and latitude data to the ground station as determined through a global positioning system ("GPS") device carried on the moving station. If a tracking lock between the ground and moving stations is lost because of an obstruction or atmospheric impairment, a time interval is calculated corresponding to the amount of time elapsed between when the moving station last passed through a designated "initial" waypoint and the current time (plus a factor corresponding to the amount of time required for the ground station to re-point its optical terminal). The time interval calculation is a modulo calculation (i.e., a calculation that takes into account the recurrent or cyclical flight path) based in part on the received GPS data from at least two GPS messages. The calculated time interval is then correlated to the cubic spline interpolation data for obtaining an estimated longitude and latitude of where the moving station will be at the end of the time interval. In other words, the time interval is cross-referenced to the estimated location vs. time of the moving station, which provides a corresponding longitude and latitude. For re-acquiring the moving station, the ground station's optical terminal is then steered to a point in space corresponding to the given longitude, latitude, and altitude, prior to the end of the time interval.

In another embodiment, instead of calculating the time interval based in part on the GPS data, the moving station may be configured to periodically send messages that include the elapsed time since the moving station passed the initial waypoint. For example, the elapsed time could be expressed as an integer number of elapsed 0.1-second intervals. If tracking lock were subsequently lost, then the "stare-point" could be determined by the time offset from the last elapsed time value.

In another embodiment, the system may be configured to employ multiple waypoints in initial acquisition, by alternating acquisition attempts over several waypoints instead of "staring" at a single waypoint.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
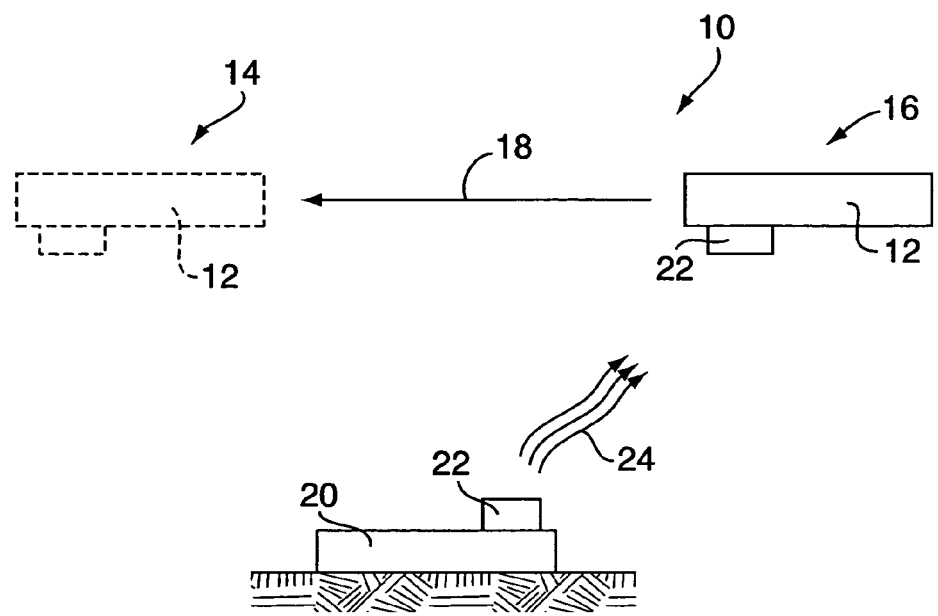
FIG. 1 is a schematic diagram of a method and system for tracking a moving station according to an embodiment of the present invention.

With reference to FIGS. 1-9, an embodiment of the present invention relates to a method and system 10 for tracking a moving station or target 12 for carrying out free space optical communications. The system 10 uses an "elapsed time"-based approach to determine the position 14 of the moving station 12 at any future point in time, based on the time difference since the moving station's 12 last known position 16. A mathematical model of the expected path 18 of the moving station 12 is used, which, when combined with the last known position 16 and time elements, can accurately predict the future position 14 of the moving station 12.

The tracking system 10 will most typically be used in the context of free space optical communications between first and second remote stations, e.g., the moving station or target 12 and a stationary ground station 20. Typically, the moving station 12 will be, for example, an unmanned aerial vehicle ("UAV") that travels generally along a designated or expected path 18 and according to a designated velocity profile. When a communication link is established between the two stations 12, 20 (optical or otherwise), it will generally be the case that the moving station 12 transmits information relating to its travel, e.g., velocity and position, back to the ground station 20. Each station 12, 20 is provided with an optical terminal 22, which may include an optical, laser-based transmitter, a lens system and receiver for receiving transmitted laser signals, and a positioning system (e.g., computer controlled gimbal system) for accurately pointing the transmitter and receiver/lens system. UAV's are often used for remote surveillance over hostile territory. Free space optical communications are often used for transmitting control information and/or surveillance data, e.g., video feed, between UAV's and ground stations, in addition to or as a replacement for radio-frequency communications. This is because free space communications offers a very high bandwidth in conjunction with a high level of security. In particular, contrary to RF communications, an open space optical signal 24 can only be blocked or intercepted along the direct, line-of-sight transmission path.

For tracking between stations 12, 20 and/or for the re-acquisition of a station 12 after a tracking lock has been lost (e.g., due to obstructions or atmospheric signal interference), the system 10 exploits the conditions that the location of the moving station 12 was once known and that the moving station 12 continually traverses a trajectory through known waypoints 28 at a known speed. The system 10 can be used in addition to, or as a replacement for, a Kalman filter algorithm or the like.

Figure 2:
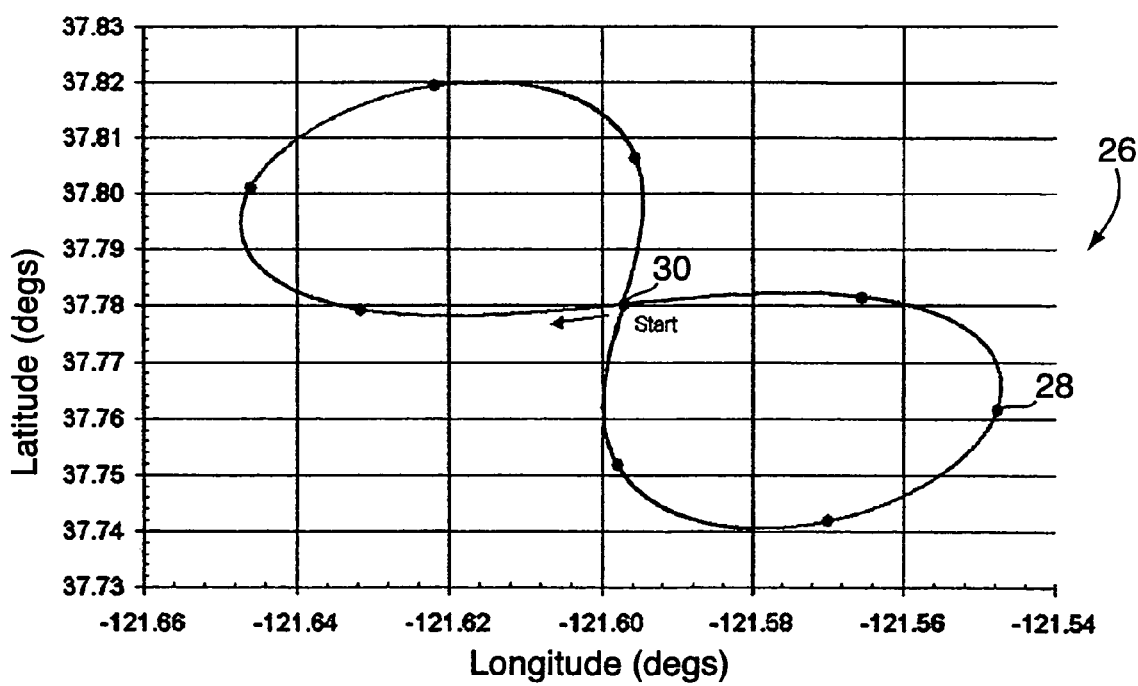
FIG. 2 is a graph of an example moving station travel path.
Figure 3:
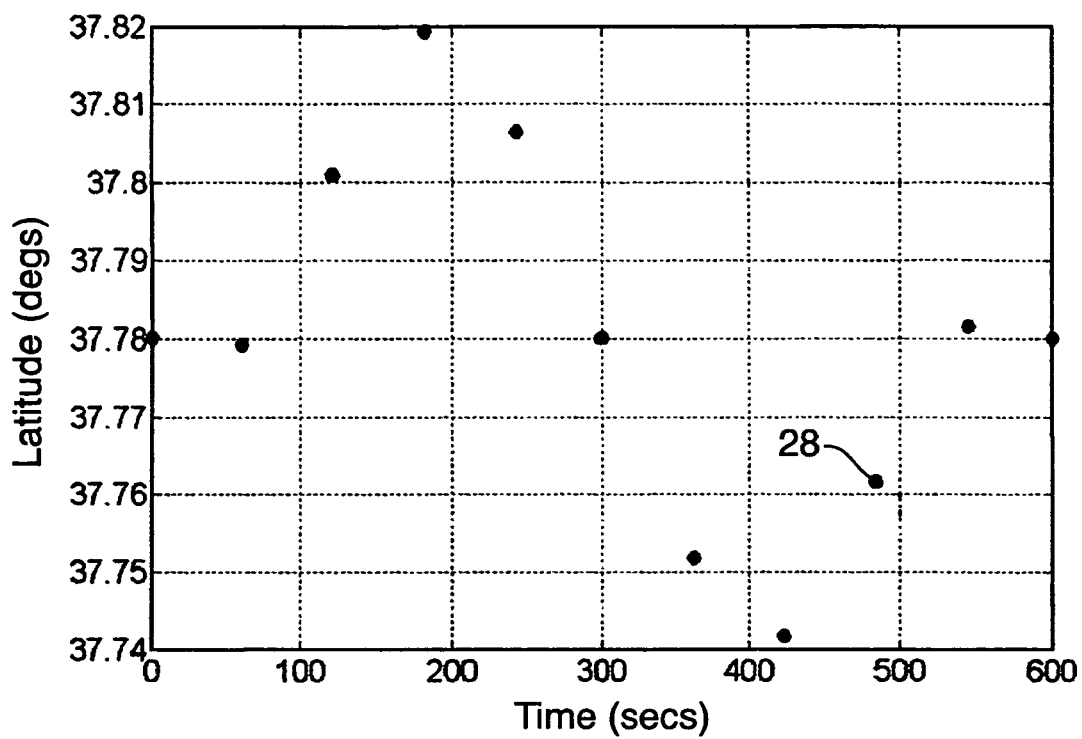
FIGS. 3 and 4 are graphs showing the coordinate locations of travel path waypoints as a function of time.
Figure 4:
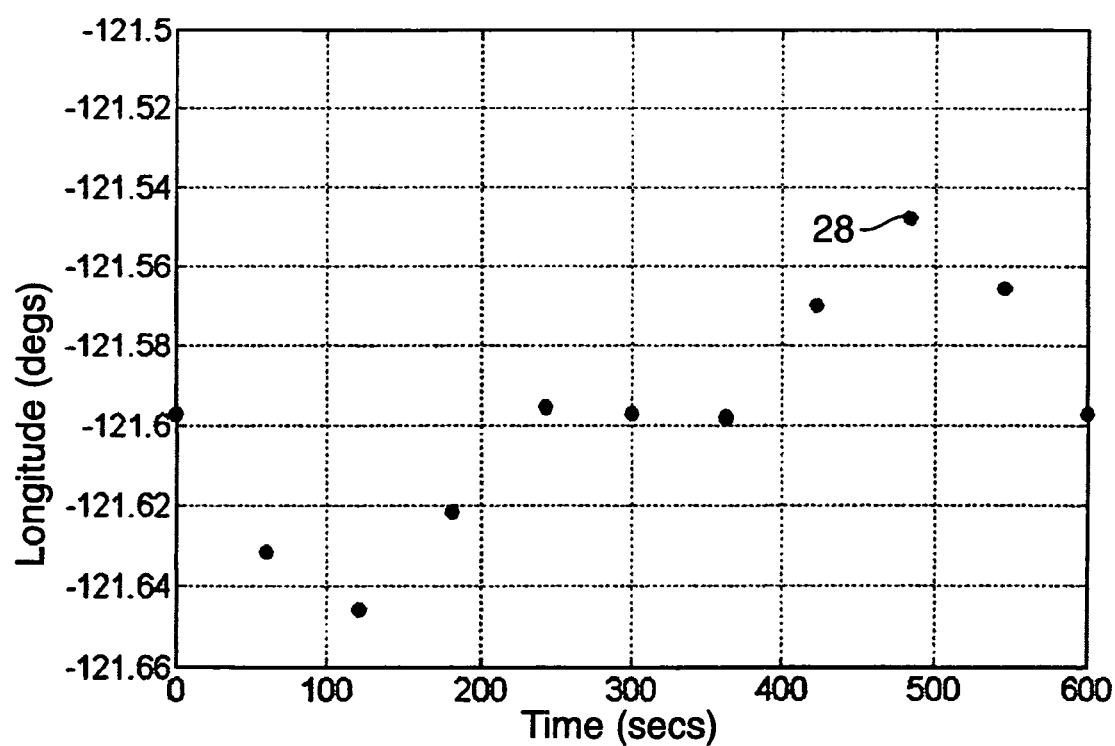
Figure 5:
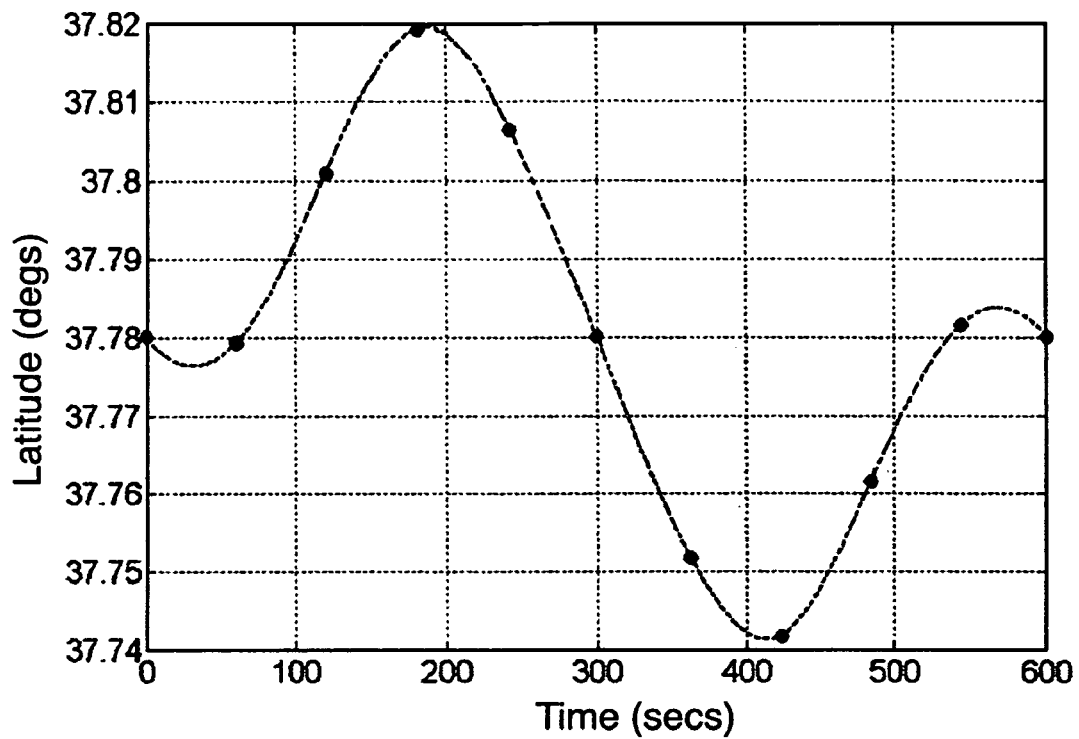
FIGS. 5 and 6 are graphs showing mathematical models of the travel path.
Figure 6:
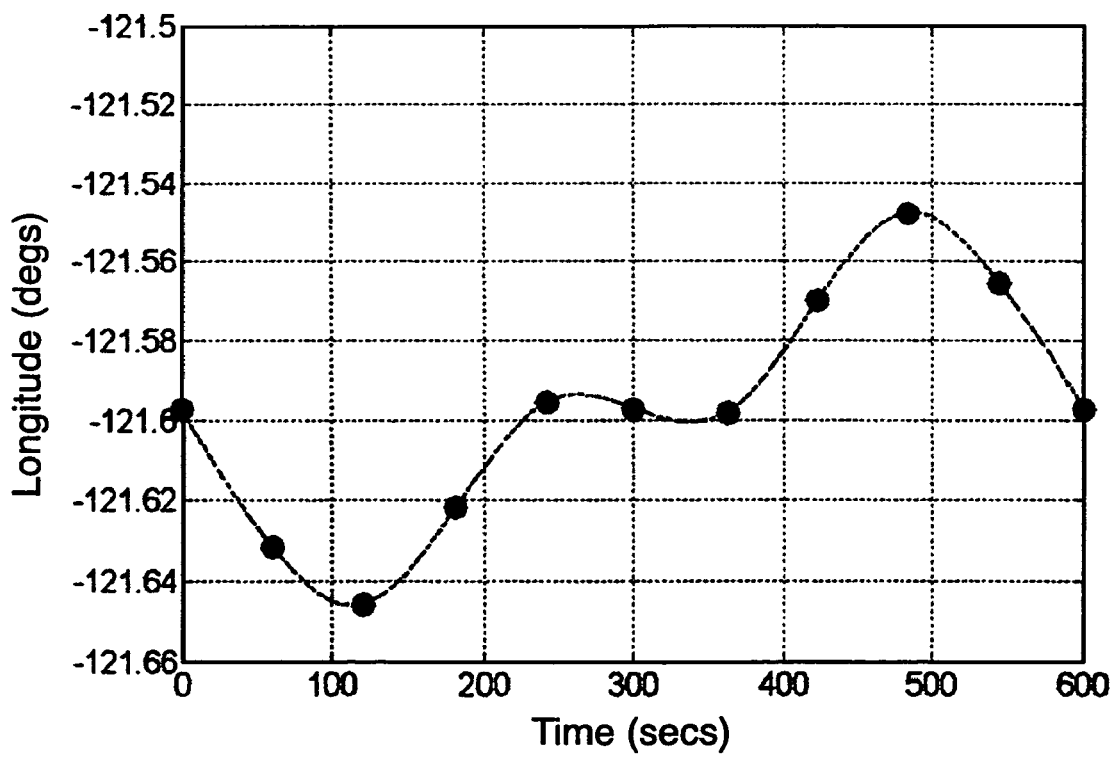

The tracking system/method 10 will now be discussed in terms of a sample "figure 8" flight pattern 26 as shown in FIG. 2. FIG. 2 shows the latitude-longitude trajectory of this flight pattern with the known waypoints 28 plotted as dots. The speed of the moving station 12 in this example was chosen to be about 100 knots. Since the speed of the moving station 12 is assumed known, the expected time intervals between waypoints 28 as well as their latitudes and longitudes can be used for re-acquisition. Let $\phi_n$, $\lambda_n$, $\tau_n$, n=1, . . . , N denote the latitude, longitude, and relative time of passage through N waypoints, respectively. FIGS. 3 and 4 plot these data points for the "figure 8" flight pattern 26 in question, which has a cycle time through the pattern of, e.g., 600 seconds. The time origin for $\tau$ (relative time of passage) is the time of passage for the waypoint at the central node 30 of the path 28 when the moving station 12 is traveling westward. For the present example, it is assumed that the moving station 12 continually flies the same pattern so that the trajectory or path 28 is repeated every 600 seconds. An estimate of the latitude and longitude of the moving station 12 at any time between the waypoints 28 can be obtained by cubic spline interpolation of the waypoint data plotted in FIGS. 3 and 4. (Splines are smooth piecewise polynomials that can be used to represent functions over large intervals, where it would be impractical to use a single approximating polynomial.) FIGS. 5 and 6 show the resulting latitude and longitude time variations that are derived from such a calculation, which can be carried out through use of a computer program, as discussed in more detail below.

For re-acquisition, e.g., after a Kalman filter output becomes inaccurate, the system 10 uses latitude $\phi_{est}(\tau_k)$ and longitude $\lambda_{est}(\tau_k)$ temporal evolution estimates that are derived at time points $\tau_k$=k$\delta$ seconds ($\delta$=0.1) from the waypoint data as shown in FIGS. 5 and 6. Additionally, GPS (global positioning system) data from the moving station 12 is saved during times when tracking is locked and such data is being received over, e.g., over a supervisory channel. For example, GPS messages may be transmitted by the moving station 12 every $\delta$=0.1 seconds. The latitude $\phi_{t'}$ and longitude $\lambda_{t'}$ of the moving station 12 from the latest supervisory channel message at real time t' are saved, as is the latitude $\phi_{t'-p\delta}$ and longitude $\lambda_{t'-p\delta}$ from the message that was received p$\delta$-seconds previously. Two sets of position data are used to resolve the ambiguity of direction of travel when the moving station 12 traverses through the central node 30 between the two loops on the "figure 8" flight path. The value "p" is typically selected so as to be large enough so that the distance traversed by the moving station 12 between times t'-p$\delta$ and t' is much larger than the expected error in the GPS data received in the supervisory channel messages. For example, a candidate value for "p" could correspond to an interval of 0.5 seconds in this example.

To reiterate, the moving station 12, as it travels along the path or route 28, periodically sends GPS messages to the ground station 20. The GPS messages contain data relating to the moving station's current longitude and latitude, among other information. This data is obtained from a standard GPS device carried in the moving station 12, in a standard manner. Two sets of position/location data (latitude and longitude) are saved, one from time t' and one from previous time t'-p$\delta$. As should be appreciated, the moving station 12 is able to send these messages when there is tracking lock between the two stations.

Figure 7:
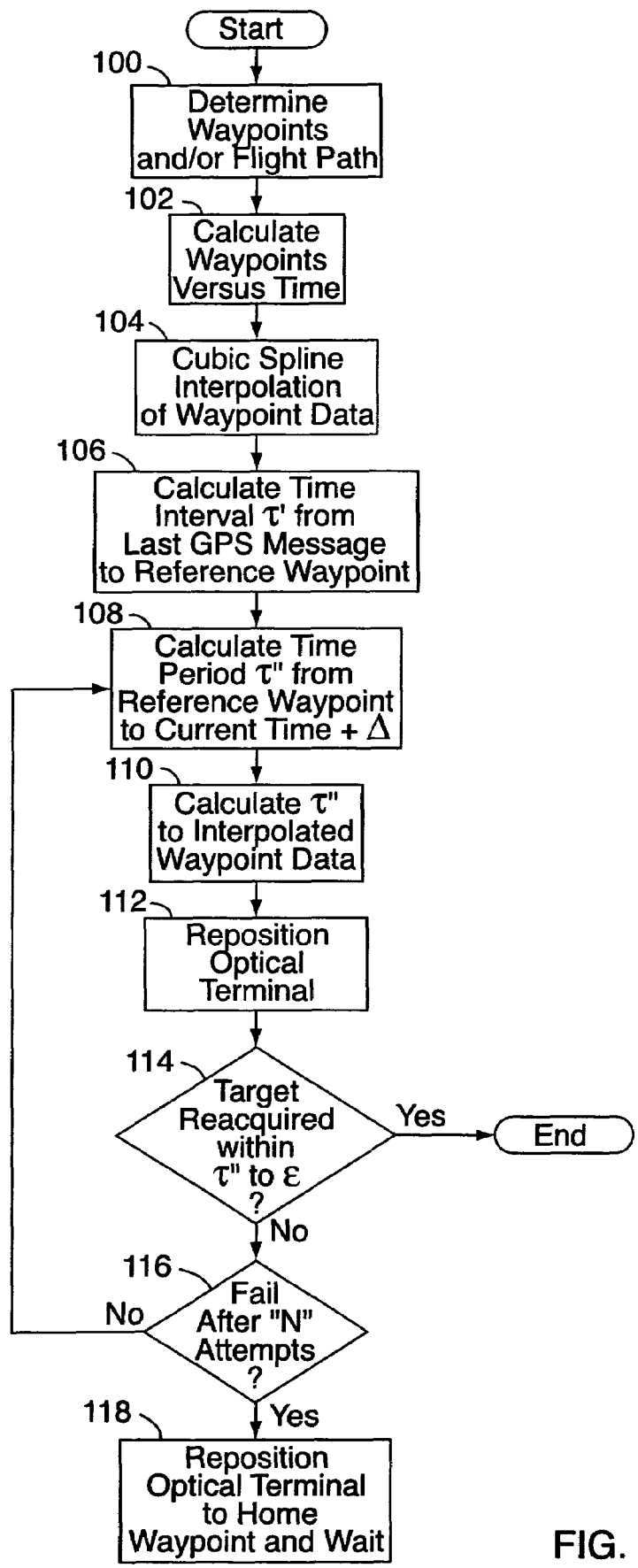
FIG. 7 is a flow chart showing the steps of the tracking method.

FIG. 7 shows the steps for re-acquisition of the moving station 12. At Steps 100, 102, and 104, if needed, various flight path data is calculated to derive an estimated relationship between moving station position and elapsed travel time from a reference or initial waypoint, e.g., the node 30. These steps are discussed below. At Step 106, at a time t' (see FIG. 8) of the last supervisory channel message, i.e., before tracking lock was lost, a time interval τ' is determined, where τ' is the time that elapsed from the moving station's last westerly passage through the central node 30 (the reference waypoint) along the path 28. In other words, τ' is the time period between the moving station's last westerly passage through the central node 30 and the real time point τ'. Next, at Step 108, a time interval τ" is calculated, where τ" corresponds to a time interval between the last passage through the central node 30 and a real time t"=t+Δ, where t is the current time and Δ is a time interval required for re-pointing the optical terminal 22 to a given "stare-point." This is given by the following, which can be verified graphically with reference to FIG. 8:

$$\tau''=\tau'+(t+\Delta-t')$$

At Step 110, the value for τ" is referenced to the cubic spline interpolation of the waypoint data such as that shown in FIGS. 5 and 6, to obtain a corresponding latitude $\phi_{est}(\tau'')$ and longitude $\lambda_{est}(\tau'')$. At Step 112, the optical terminal 22 is pointed to "stare" at the azimuth and elevation corresponding to latitude $\phi_{est}(\tau'')$ and longitude $\lambda_{est}(\tau'')$. Alternatively, the optical terminal 22 is pointed to stare at the next waypoint 28 after $\phi_{est}(\tau'')$ and $\lambda_{est}(\tau'')$. If the moving station 12 is not re-acquired by time t"+ε, where ε is an appropriate wait interval, as determined at Step 114, the process is repeated as back as Step 108. If the re-acquisition process fails after "N" repetitions, as determined at Step 116, where N is user selected, the optical terminal is pointed to a selected "home" waypoint of the flight pattern 26 for waiting until reacquisition occurs, as at Step 118.

In Step 106, the interval τ' is computed as $\tau_{k'}$, where k' is the index k that minimizes:

$$|\phi_{t'}-\phi_{est}(\tau_k)|+|\lambda_{t'}-\lambda_{est}(\tau_k)|+|\phi_{t'-p\delta}-\phi_{est}(\tau_{k-p})|+|\lambda_{t'-p\delta}-\lambda_{est}(\tau_{k-p})|$$

Note that the indices in this equation are computed modulo the number of values in the 600-second flight path 26 that is cyclically repeated by the moving station 12. This calculation, as well as the spline fit to the waypoints that is used to calculate the latitude $\phi_{est}(\tau_k)$ and longitude $\lambda_{est}(\tau_k)$ estimates at time intervals of δ=0.1 seconds (Step 104) can be performed using a computer program, e.g., a MATLAB® program. An example program is shown at the end of the Detailed Description section. The functions "spline_cubic_set", "spline_cubic_val", and "d3_np_fs" are available in a C++ library ("SPLINE") that can be downloaded from the website at the following URL and elsewhere: http://www.csit.fsu.edu/~burkardt/m_src/spline/spline.html.

In certain applications, it may be necessary to first compute a set of waypoints and/or the time intervals between the waypoints (i.e., derive information such as shown in FIGS. 3 and 4), for purposes of computing the cubic spline interpolation, at Steps 100 and 102 in FIG. 7. For example, it may be the case that a mission's parameters are defined only in terms of a geographic region of interest, an altitude, a velocity range, and/or a possible or designated flight path. To determine the time values for a given set of waypoints for cubic spline interpolation, a flight path or pattern is first chosen at Step 100, depending on mission or other parameters. For example, aerial surveillance and reconnaissance may use a "figure 8" flight path, as described above. In such a case, the figure-8 flight path could be constructed by combining two circles of diameter "D" and by displacing the centers by slightly more than 1.015·D. Waypoints would then be specified on each of the two circles and at the node 30 between the two circles using rectangular coordinates in an X-Y plane at the altitude to be flown. Next, a constant speed S is chosen for the moving station 12, depending on mission parameters and/or equipment constraints. Subsequently, the time interval Δt between each pair of waypoints would be calculated according to the following at Step 102:

Δt=distance between waypoints/S

Figure 8:
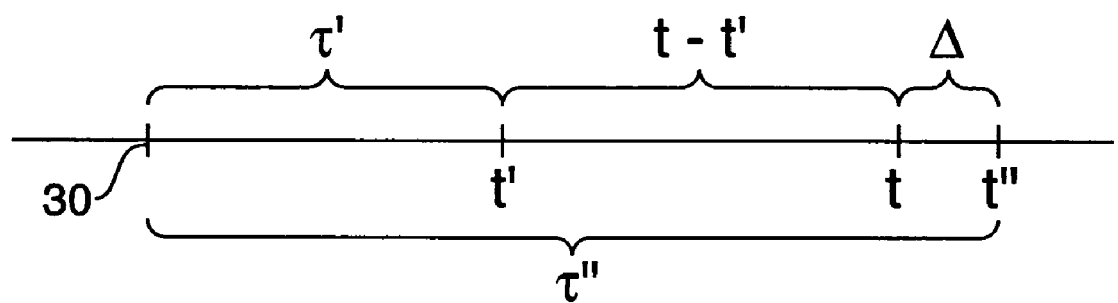
FIGS. 8 and 9 are schematic diagrams graphically illustrating various time interval calculations.
Figure 9:
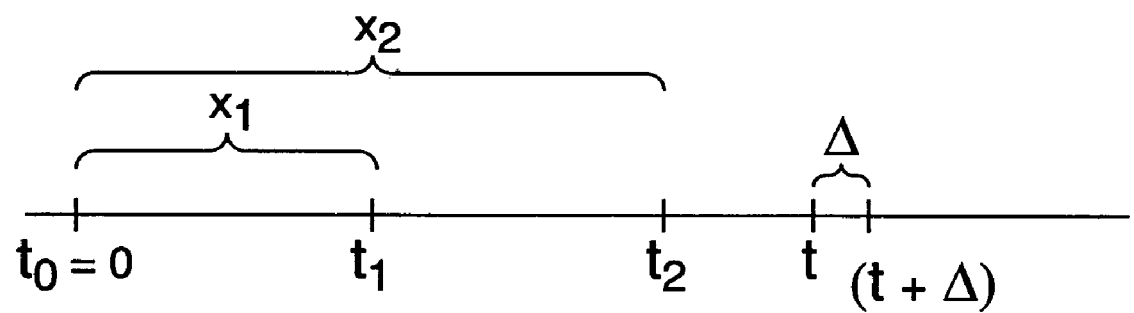

For curved portions of a figure-8 flight path:

Δt=((D/2)·ΔΘ)/S, where

ΔΘ=angle traversed along the circular arc between the waypoints, i.e., the central angle measured at the center of the circle distance along a circular arc=radius·angle traversed= (D/2)·(ΔΘ)

In a figure-8 flight path, a straight-line trajectory would be assumed from the proceeding and following waypoints to a center node 30. This would result in a time interval between the proceeding and/or following waypoint calculated according to the following:

Δt=L/S, where

L=length of straight line segment

Given the calculated time intervals between waypoints, the value τ (respective time intervals from node 30 to each waypoint) would then be calculated using simple arithmetic. The rectangular (X-Y) waypoint coordinates would then be transformed into latitude and longitude, resulting in graphs or data sets similar to those shown in FIGS. 5 and 6, which could then be subjected to cubic spline interpolation as described above. This process could be modified or adjusted depending on the characteristics of the particular moving station 12 and/or mission parameters.

Once the position of the moving station 12 in the flight pattern 26 has been determined according to the above, the ground station 22 will be able to follow the predicted flight pattern by examining only a few spline points, i.e., several of the interpolated data points as shown in FIGS. 5 and 6, in the vicinity of the previously-determined position. Also, as indicated above, it may be possible and/or beneficial to implement the system 10 in place of a Kalman filter or the like, for simplifying any computer code required for implementing the mathematical and other calculations carried out according to the present invention.

To summarize, for re-acquiring a moving station 12 after the loss of tracking lock, a cubic spline interpolation is used to mathematically estimate the flight path 26 of the moving station 12 between a set of known waypoints 28. The resultant interpolation provides a series of data points/curves representing estimated longitude/latitude as a function of time. See FIGS. 5 and 6. Conceptually, the next step is to determine a particular point (defined by altitude, longitude, and latitude) through which the moving station 12 will pass at a particular time, and to re-position the ground station optical terminal 22 to stare at that point just prior to the moving station 12 arriving there. To do so, a time interval τ" is calculated, which corresponds to the time period between the current time and the point in time at which the moving station 12 last passed through a particular waypoint, e.g., the node 30, plus a factor Δ for repositioning the optical terminal. This is related to the interpolated flight path data in that the time=0 point on the interpolated data corresponds to the time point of the moving station 12 passing through the node 30. The value of τ" is calculated based in part on GPS-sourced position data received from the moving station 12 prior to the tracking lock being lost. Once calculated, τ" is cross-referenced to the interpolated flight path data, which provides an estimate of the moving station's future location (longitude and latitude) at the end of time period τ". The ground station optical terminal 22 is then re-pointed to stare at a point in space corresponding to the altitude (a known, pre-designated value) and estimated longitude and latitude.

As an enhancement to the tracking and re-acquisition method described above with reference to FIGS. 7 and 8, the system 10 could be configured so that the current position of the moving station 12 is determined based on position timing information periodically sent by the moving station 12 to the ground station 20. Such information could be included in messages sent over the supervisory channel during intervals of tracking lock. In addition to including latitude and longitude information, the messages would also include the known current position of the moving station 12 in the flight path 26, in terms of the elapsed time since a designated initial waypoint, e.g., node 30. The elapsed time could be expressed as an integer number of elapsed 0.1-second intervals or the like. If acquisition was subsequently lost, then the stare-point could be determined by the time offset from the known position. For example, with reference to FIG. 9, the moving station 12 would initially send a message at an initial time point $t_0$ corresponding to when the moving station 12 was located at the initial waypoint 30. Subsequently, the moving station 12 would send additional messages on a periodic basis, e.g., at time points $t_1$ and $t_2$. Each message would contain an integer number $X_1$, $X_2$, etc. corresponding to the number of 0.1-second intervals since time point $t_0$. If tracking lock were to be lost, e.g., between time points $t_2$ and $t_1$ the total elapsed time between $t_0$ and t would be known—the time interval between $t_0$ and $t_2$ based on the integer number $X_2$, and the time interval between $t_2$ and t based on the time difference there between.

If acquisition is not attained at one stare-point, then acquisition using other stare-points may be attempted whenever it is computed that the moving station 12 has moved past the range of that stare-point. This could be continued indefinitely, or until it was decided to return to a fixed set of stare-points that were used for initial acquisition.

For re-acquisition, the ground station 20 can be configured to select stare-points using only the waypoints 28, and/or using intermediate points along the estimated flight path calculated through a cubic spline interpolation of the known waypoints 28, e.g., such as shown in FIGS. 5 and 6. This choice would depend on information regarding the expected accuracy of moving station flight relative to the waypoints 28, as well as on the expected accuracy of the intermediate points predicted via a spline fit.

According to an additional, optional feature of the present invention, multiple waypoints may be employed for initial acquisition of the moving station 12 (i.e., when no reliable position history is available). This would be done by sequentially alternating acquisition attempts over several "stare-points" instead of staring at a single waypoint, thus reducing the expected delay to achieve acquisition. To illustrate, consider the case where a tracking lock can be achieved within an approximate ten-second window around a waypoint (i.e., five seconds on either side). Coupled with a typical time delay of about 1.3 seconds to attempt to attain a tracking lock, this suggests that multiple stare points can be advantageously employed when attempting to achieve initial acquisition. The approach used is to cycle through the set of stare-points, one after the other, allowing just enough time at each to achieve acquisition. The exact duration is based on the hardware operational characteristics and mission parameters. For example, a simulation has shown that four waypoints could be used instead of a single "home" waypoint, and, in fact, an arbitrary number of "stare" waypoints could be used. Note that this approach may be revised based on the expected error between the theoretical and actual waypoint positions of the moving station 12, and in consideration of any opportunities to shorten the time for the optical terminal 22 to achieve tracking lock.

The system and method 10 provides the benefits of target re-acquisition with less delay. Additionally, it improves the time duration when optical signal transmission is possible, and increases the quantity of data that can be transmitted. The system 10 would be especially advantageous in use as a part of an optical communications system in which one or both stations are mobile, the stations move in predefined patterns, and in which there might be periodic transmission interruptions.

Although the present invention has been illustrated primarily with respect to a ground station 20 tracking a moving station 12, it should be appreciated that the invention is applicable for implementation on or between any stations in relative movement, e.g., between two moving stations, or where a moving station tracks a non-moving station.

The following is a sample MATLAB® program for carrying out the cubic spline interpolation and the calculation τ' according to the above:

```
fid = fopen('tlatlonEA.txt', 'r');
D = fscanf(fid, '%g %g %g\n', [5 inf]);
D = D';
fclose(fid)
[K, M] = size (D)
t(1:K) = D(1:K,1);
lat(1:K) = D(1:K, 2);
lon(1:K) = D(1:K, 3);
fid = fopen('tWlatWlon.txt', 'r');
C = fscanf (fid, '%g %g %g\n', [5 inf]);
C = C';
fclose(fid)
[L, N] = size(C)
tW(1:L) = C(1:L,1);
latW(1:L) = C(1:L,2);
lonW(1:L) = C(1:L,3);
figure
plot (tW, latW, ' * ')
ypp = spline_cubic_set(L, tW, latW, 0, 1, 0, 1);
for u=1:K
    latI(u)=spline_cubic_val(L, tW, latW, ypp, t(u));
end
hold on
plot(t, lat, '-r')
hold on
plot(t, latI, '-g')
clear ypp;
ypp = spline_cubic_set(L, tW, lonW, 0, 1, 0, 1);
for u=1:K
    lonI(u)=spline_cubic_val(L, tW, lonW, ypp, t(u));
end
figure
plot(tW, lonW, ' * ')
hold on
plot(t, lon, '-r')
hold on
plot(t, lonI, '-g')
kk =3001 % Central node index
tkk = t (kk); %True value of tau prime
back = 5;
for k = 1:K
```

-continued

```
meas(k) = abs(lat(kk)−latI(k)) + abs(lon(kk)−lonI(k)) +
abs(lat(mod__1(kk−back,6000))−latI(mod__1(k−back,6000))) +
abs(lon(mod__1(kk−back, 6000))−lonI(mod__1(k−back,6000)));
end
[mn, kk__est] = min(meas);
tkk__est = t(kk__est); % Estimated value of tau prime
fprintf('True tau prime %g Estimated tau prime %g\n', tkk, tkk__est)
function y=mod__1(x, n)
if x > 0 & x < n+1
    y = x;
elseif x > n
    y = x−n;
else
y = x + n;
end
```

Since certain changes may be made in the above-described method and system for tracking a moving station or target in free space communications, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method of tracking a station in relative movement comprising the steps of:
   calculating a mathematical model of a travel path of the station;
   determining a time interval between when the station passed a designated point along the travel path and a future time;
   determining a future position of the station based on the time interval and the mathematical model; and
   re-pointing an optical terminal to stare at the future position, wherein the optical terminal is configured to carry out free space optical communications with the station once the station is acquired, for the exchange of data between the station and optical terminal.

2. The method of claim 1 wherein the step of determining the future position comprises correlating the time interval to the mathematical model.

3. The method of claim 1 wherein:
   the travel path is defined by a plurality of waypoints including the designated point; and
   the mathematical model is a cubic spline interpolation of the plurality of waypoints referenced to a time scale.

4. The method of claim 3 wherein the step of determining the future position comprises correlating the time interval to the mathematical model.

5. The method of claim 1 further comprising the step of periodically receiving position data from the station, wherein the time interval is determined based at least in part on the position data.

6. The method of claim 5 wherein the position data comprises longitude and latitude data from a global positioning system.

7. The method of claim 5 wherein the position data comprises a time index relating to when the station passed the designated point.

8. The method of claim 5 wherein:
   the travel path is defined by a plurality of waypoints including the designated point; and
   the mathematical model is a cubic spline interpolation of the plurality of waypoints referenced to a time scale.

9. The method of claim 8 wherein the step of determining the future position comprises correlating the time interval to the mathematical model.

10. The method of claim 5 wherein the step of determining the future position comprises correlating the time interval to the mathematical model.

11. The method of claim 1 wherein the future time comprises the sum of a current time and at least a minimum time interval required for re-pointing the optical terminal.

12. The method of claim 1 wherein:
    the travel path is defined by a plurality of waypoints including the designated point; and
    the method further comprises the step of initially acquiring the station by repeatedly re-pointing the optical terminal to stare at different waypoints until the station is acquired.

13. A method of tracking a relatively moving station comprising the steps of:
    determining a time interval between when the station was at a last known position along a designated travel path and a future time;
    determining a future position of the station along the designated travel path based on the time interval; and
    re-pointing an optical terminal to stare at the future position, wherein the optical terminal is configured to carry out free space optical communications with the station once the station is acquired, for the exchange of data between the station and optical terminal.

14. The method of claim 13 further comprising the step of calculating a mathematical model of the travel path, wherein the future position is determined based at least in part on the mathematical model and the time interval.

15. The method of claim 14 wherein the step of determining the future position comprises correlating the time interval to the mathematical model.

16. The method of claim 15 wherein:
    the travel path includes a plurality of waypoints; and
    the mathematical model is a cubic spline interpolation of the plurality of waypoints referenced to a time scale.

17. The method of claim 13 wherein:
    the travel path includes a plurality of waypoints; and
    the method further comprises the step of initially acquiring the station by repeatedly re-pointing the optical terminal to stare at different waypoints until the station is acquired.

18. The method of claim 13 wherein the future time comprises the sum of a current time and at least a minimum time interval required for re-pointing the optical terminal.

19. A method of free space optical communications with a station in relative movement, the method comprising the steps of:
    pointing an optical terminal to stare at a first of a plurality of known waypoints along a path of travel of the station;
    if an actual location of the station does not coincide with the first waypoint, repeatedly re-pointing the optical terminal to stare at different known waypoints until the actual location of the station coincides with a currently stared-at waypoint; and
    transmitting optical data signals to the station from the optical terminal.

20. The method of claim 19 wherein the optical terminal is left to stare at each of the waypoints to which it is pointed for a designated time period prior to re-pointing the optical terminal to stare at a different waypoint.

21. A method of tracking a station in relative movement comprising the steps of:

calculating a mathematical model of a travel path of the station;

determining a time interval between when the station passed a designated point along the travel path and a future time;

determining a future position of the station based on the time interval and the mathematical model;

re-pointing an optical terminal to stare at the future position; and carrying out continuous free space communications over the optical terminal with the station once the station is acquired, wherein the continuous free space communications include an exchange of data between the station and the optical terminal.

22. A method of tracking a station in relative movement comprising the steps of:

establishing a tracking lock on the station;

calculating a mathematical model of a travel path of the station based on the tracking lock;

determining a time interval between when the station passed a designated point along the travel path and a future time;

determining a future position of the station based on the time interval and the mathematical model;

re-pointing an optical terminal to stare at the future position; and re-acquiring the station after the tracking lock is lost based on the re-pointing, wherein the optical terminal is configured to carry out free space optical communications with the station once the station is acquired, for the exchange of data between the station and optical terminal.

* * * * *

UNITED STATES PATENT AND TRADEMARK OFFICE
CERTIFICATE OF CORRECTION

PATENT NO.       : 7,602,480 B2                                              Page 1 of 1
APPLICATION NO.  : 11/259501
DATED            : October 13, 2009
INVENTOR(S)      : Romain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 28 days.

Signed and Sealed this

Fifth Day of October, 2010

David J. Kappos
*Director of the United States Patent and Trademark Office*